(12) United States Patent
Hale et al.

(10) Patent No.: US 9,748,784 B2
(45) Date of Patent: Aug. 29, 2017

(54) DETECTING BATTERIES WITH NON-UNIFORM DRAIN RATES

(75) Inventors: Nathan Hale, Denver, CO (US); Paul Langer, Westminster, CO (US); Jeremy Mickelsen, Denver, CO (US); Tom Monikowski, Centennial, CO (US); Adam Schafer, Littleton, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 536 days.

(21) Appl. No.: 13/224,120

(22) Filed: Sep. 1, 2011

(65) Prior Publication Data

US 2013/0057777 A1   Mar. 7, 2013

(51) Int. Cl.
*H02J 7/00* (2006.01)

(52) U.S. Cl.
CPC ..... *H02J 7/0063* (2013.01); *H02J 2007/0067* (2013.01); *Y10T 307/685* (2015.04)

(58) Field of Classification Search
USPC ...................... 340/363.1, 539.11, 12.5, 691.3
See application file for complete search history.

(56) References Cited

U.S. PATENT DOCUMENTS

| | | | | |
|---|---|---|---|---|
| 5,099,211 | A | | 3/1992 | Nowak .......................... 324/434 |
| 5,442,345 | A | * | 8/1995 | Kwon ........................... 340/7.37 |
| 5,504,415 | A | * | 4/1996 | Podrazhansky et al. ..... 320/118 |
| 5,644,209 | A | | 7/1997 | Chabbert et al. |
| 5,963,010 | A | | 10/1999 | Hayashi et al. ............... 320/106 |
| 5,965,996 | A | * | 10/1999 | Arledge et al. ............... 320/116 |
| 5,998,969 | A | * | 12/1999 | Tsuji et al. ..................... 320/132 |
| 6,252,376 | B1 | * | 6/2001 | Nakamura et al. ........... 320/132 |
| 6,297,618 | B2 | * | 10/2001 | Emori et al. ................... 320/132 |
| 6,373,256 | B1 | | 4/2002 | Hanjani et al. ............... 324/433 |
| 6,384,576 | B1 | | 5/2002 | Jokinen .......................... 320/122 |
| 6,437,539 | B2 | * | 8/2002 | Olsson et al. ................. 320/118 |
| 6,449,726 | B1 | | 9/2002 | Smith ........................... 713/340 |
| 6,762,588 | B2 | * | 7/2004 | Miyazaki .............. H02J 7/0026 320/116 |
| 6,891,352 | B2 | * | 5/2005 | Miyazaki .............. H02J 7/0026 320/118 |
| 7,124,040 | B2 | * | 10/2006 | Engelhardt et al. ............. 702/58 |
| 7,598,701 | B2 | * | 10/2009 | Odaohhara ................... 320/106 |
| 8,174,237 | B2 | * | 5/2012 | Kosugi ................. B60L 3/0046 320/116 |

(Continued)

FOREIGN PATENT DOCUMENTS

KR   10-0814128 B1   3/2008
KR   10-2011-0052384 A   5/2011

OTHER PUBLICATIONS

International Search Report dated Jan. 30, 2013 from International Application No. PCT/US2012/053161 (2 pages).

(Continued)

*Primary Examiner* — Fekadeselassie Girma
(74) *Attorney, Agent, or Firm* — Seed Intellectual Property Law Group LLP

(57) ABSTRACT

A remote control is powered by multiple batteries connected in series. The remote control includes a voltage comparison circuit configured to compare a midpoint voltage from a node connecting two of the batteries to a reference voltage. The remote control is able to determine if there is a non-uniform drain rate in the batteries based on the comparison.

16 Claims, 9 Drawing Sheets

(56) References Cited

U.S. PATENT DOCUMENTS

| | | | | |
|---|---|---|---|---|
| 8,463,562 | B2* | 6/2013 | Nakanishi | B60L 3/0046 320/120 |
| 8,638,066 | B2* | 1/2014 | Robertson | 320/132 |
| 8,717,035 | B2* | 5/2014 | Shook | G01R 31/026 320/162 |
| 2003/0015995 | A1* | 1/2003 | Tamura et al. | 320/162 |
| 2003/0044689 | A1* | 3/2003 | Miyazaki et al. | 429/320 |
| 2003/0087147 | A1* | 5/2003 | Minamiura | 429/61 |
| 2004/0239333 | A1* | 12/2004 | Kikuchi | 324/434 |
| 2004/0257041 | A1* | 12/2004 | Nagaoka | 320/128 |
| 2005/0110460 | A1* | 5/2005 | Arai | B60L 3/0046 320/116 |
| 2005/0140334 | A1* | 6/2005 | Tamai | H02J 7/0019 320/116 |
| 2005/0247775 | A1* | 11/2005 | Gloekler et al. | 235/375 |
| 2006/0017581 | A1 | 1/2006 | Schwendinger et al. | 340/636.1 |
| 2007/0018613 | A1* | 1/2007 | Miyazaki | H02J 7/0026 320/116 |
| 2008/0059000 | A1* | 3/2008 | Hornick et al. | 700/297 |
| 2008/0315832 | A1* | 12/2008 | Kondo | 320/110 |
| 2009/0087722 | A1* | 4/2009 | Sakabe | B60L 3/0046 429/61 |
| 2009/0179650 | A1* | 7/2009 | Omagari | G01R 31/3624 324/433 |
| 2009/0208821 | A1* | 8/2009 | Kosugi | B60L 3/0046 429/61 |
| 2009/0262254 | A1* | 10/2009 | Reams | 348/734 |
| 2010/0004885 | A1* | 1/2010 | Nakanishi | 702/63 |
| 2010/0007506 | A1* | 1/2010 | Fischer | 340/636.1 |
| 2011/0148425 | A1* | 6/2011 | Shook et al. | 324/433 |
| 2011/0193413 | A1* | 8/2011 | Kudo | H02J 7/0018 307/77 |
| 2011/0248679 | A1* | 10/2011 | Tien et al. | 320/120 |
| 2012/0093334 | A1* | 4/2012 | Schreuder et al. | 381/74 |
| 2012/0242344 | A1* | 9/2012 | Ishishita | B60L 3/0046 324/430 |
| 2012/0253717 | A1* | 10/2012 | Ito et al. | 702/63 |
| 2012/0256598 | A1* | 10/2012 | Hsu et al. | 320/148 |
| 2012/0262180 | A1* | 10/2012 | Ishishita | G01R 19/16542 324/430 |
| 2013/0113428 | A1* | 5/2013 | Emori et al. | 320/118 |
| 2013/0338950 | A1* | 12/2013 | Joe et al. | 702/63 |

OTHER PUBLICATIONS

Der, "How to Simplify the Design of an RF Remote Control," isQED Symposium 2011, Santa Clara, CA, Mar. 14-16, 2011, URL=http://low-powerwireless.com/blog/designarticles/how-to-simplify-the-design-of-an-rf-remote-control/, downloaded Mar. 29, 2011.

Hande et al., "An electromechanical transfer circuit to measure individual battery voltages in series packs," *Journal of Power Sources* 162:719-726, 2006.

* cited by examiner

DETECTING BATTERIES WITH NON-UNIFORM DRAIN RATES

BACKGROUND

Technical Field

The present application relates to the field of managing batteries in an electronic device. The present invention relates more particularly to a system for managing battery monitoring in a remote control for a set top box.

Description of the Related Art

Portable electronic devices are typically powered by batteries. Often to obtain a desired voltage level multiple batteries are connected in series. Batteries may also be connected in parallel to provide additional current capacity. Additionally, batteries may be connected in a combination of serial and parallel connected cells. When the voltage level of the connected batteries falls below a minimum operating voltage level the device will cease to function.

In many devices it is detrimental for the device to suddenly cease functioning because the voltage at the device's power terminals has dropped below the minimum operating voltage. In some such devices a circuit has been added to measure the voltage of the batteries. If the voltage is approaching the minimum operating voltage level then the portable electronic device may issue a warning signal to a user to indicate that the batteries will need to be replaced soon.

BRIEF SUMMARY

One embodiment of the invention is a portable electronic device that includes a battery port configured to receive a plurality of batteries to be connected in series. A comparison circuit is configured to measure an intermediate voltage at an intermediate node connecting two of the batteries in series. The comparison circuit compares the intermediate voltage to a reference voltage to determine if one battery is draining more quickly than the other.

In one embodiment the comparison circuit outputs a low battery signal to the user if one battery is draining more quickly than the other. In one embodiment the electronic device will not function if the comparison circuit finds that one battery is draining more quickly than the other, even though the total series voltage is still enough to power the electronic device. This can help prevent a dangerous situation in which a quickly discharging battery can begin to leak battery acid or other harmful materials if it is not replaced soon.

In one embodiment the portable electronic device is a remote control, for a T.V. or other entertainment system. In one embodiment the portable electronic device is a controller for a gaming system.

DETAILED DESCRIPTION

Batteries are used to power a very large variety of electronic devices. These devices include remote controls, PDAs, MP3 players, smart phones, game controllers, laptop computers, tablets, headlamps, and many more devices. Often times these devices are powered by multiple batteries connected in series to obtain a higher voltage than a single cell can provide. As the batteries discharge the series voltage gradually decreases until the electronic device can no longer be powered by the batteries. At this point the user of the electronic device will replace the batteries or recharge them.

Generally batteries of a same type will discharge at the same rate when connected in series in an electronic device. However, on occasion a defective battery will not discharge properly and its voltage will begin to decrease at a faster rate than a properly functioning battery of the same type. Such an accelerated voltage decline often is a precursor to a more dangerous problem, chemical leakage or fire from the battery.

The voltage across the terminals of a battery is a function of carefully arranged chemicals or materials. The particular materials determine the voltage of the battery. It is often very harmful for a human to touch, ingest, or inhale the fumes of the chemicals in a battery. Thus it is very dangerous to people when a battery corrodes and chemicals leak out. Such a condition is common in malfunctioning batteries with accelerated charge depletion.

Figure 1:
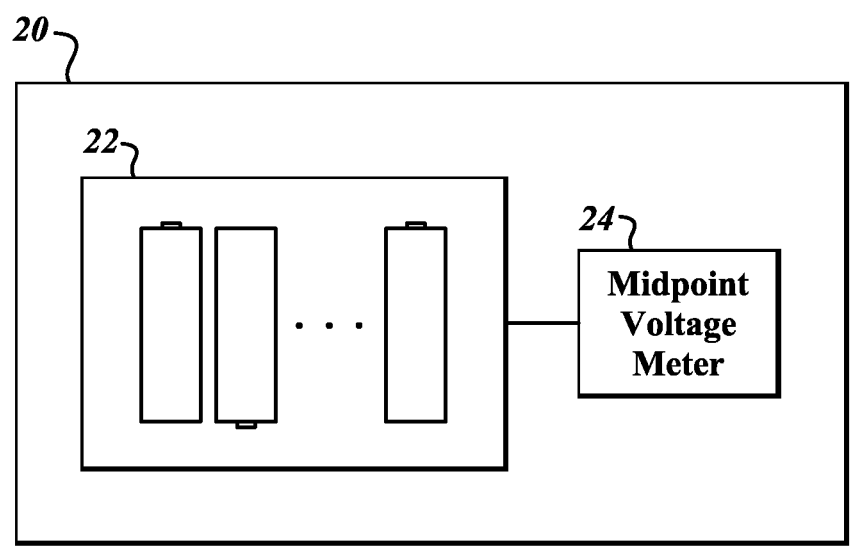
FIG. 1 illustrates an electronic device according to one embodiment

FIG. 1 illustrates an electronic device 20 comprising a battery stack 22 and a midpoint voltage meter 24 connected to the battery stack 22. The battery stack 22 houses two or more batteries connected in series. The total series voltage is used to power the electronic device 20. The midpoint voltage meter 24 is connected to a midpoint node connecting two or three or more of the batteries together in series. The midpoint voltage meter 24 measures the voltage at the midpoint node and determines if one battery in the battery stack 22 has a different voltage than another battery in the stack 22. Such a difference in voltage can indicate that one battery is improperly losing voltage and is at risk of leaking chemicals.

The midpoint voltage meter 24 can measure the voltage at the midpoint node and compare it to the total series voltage, or a fraction of the total series voltage. For example if there are two batteries in the battery stack 22, then the midpoint voltage meter 24 could compare the midpoint voltage to half of the total series voltage. If the midpoint voltage is different than half of the total series voltage, then one battery has a lower voltage than the other battery. If the midpoint voltage is different (either greater or smaller) than half the series voltage by a selected threshold difference, then the midpoint voltage meter 24 can determine that one battery is in danger of leaking and can force the user to replace both batteries by causing the electronic device 20 to cease operation. This can be done in spite of the fact that the total series voltage is still enough to power the device 20. In one embodiment instead of forcing the electronic device 20 to cease operation, the midpoint voltage meter 24 can output a low battery signal or other signal that will indicate to the user to replace the batteries. In this way the user can replace the batteries before one or more batteries corrodes and begins leaking.

The threshold difference can be, for example, a selected fraction of the total series voltage, such as 1/e, where e ~2.718. In other embodiments the threshold difference can be any other suitable percentage according to the preferences of the designer of the device.

The electronic device 20 can be any battery powered electronic device including a remote control for a set top box, another type of remote control, a remote control vehicle, a PDA, an MP3 player, a smart phone, a game controller, a laptop computer, a tablet, an automobile, a headlamp, or any other applicable device. In other embodiments the electronic device can include devices connected to AC power having battery backup, such as a fire alarm, a carbon monoxide alarm, or other suitable devices.

In other embodiments the batteries may be connected in parallel. In such an embodiment the voltage of each battery may be monitored to detect if one or more batteries are discharging more quickly than others. In one embodiment multiple batteries may be connected in series while others are connected in parallel. In such an embodiment both the serial and parallel voltages can be monitored to detect uneven discharge of the batteries.

Figure 2:
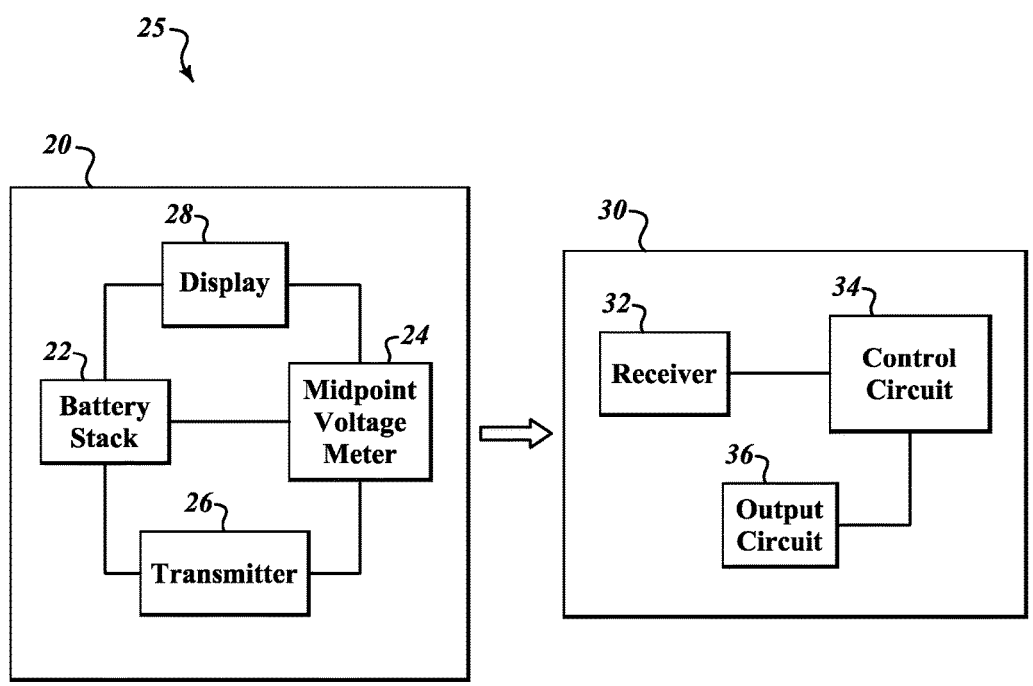
FIG. 2 illustrates a system according to one embodiment.

FIG. 2 illustrates a system 25 including an electronic device 20. The electronic device 20 includes a battery stack 22 configured to power the electronic device 20, a midpoint voltage meter 24 coupled to the battery stack 22, a transmitter 26 coupled to the battery stack 22 and the midpoint voltage meter 24, and a display 28 coupled to the battery stack 22 and the midpoint voltage meter 28.

The system 25 further includes a processing device 30 configured to receive commands from the electronic device 20. The processing device 30 includes a receiver 32 coupled to a control circuit 34. The control circuit 34 is further coupled to an output circuit 36.

The electronic device 20 is configured to control the processing device 30 with wireless signals transmitted from transmitter 26 and received by receiver 32. The electronic device 20 is for example a remote control, and the processing device 30 responds to the commands of the electronic device 20.

The battery stack 22 powers the electronic device 20 as well as the midpoint voltage meter 24, the transmitter 26, and the display 28. The midpoint voltage meter 24 is connected to the battery stack 22 as described in relation to FIG. 1. Furthermore the midpoint voltage meter 24 is configured to measure a midpoint voltage of the battery stack as described in relation to FIG. 1. The midpoint voltage meter 24 is further configured to send a signal to display 28 if the midpoint voltage meter 24 detects that a battery's voltage is depleting too quickly or near threshold of operation. The display 28 then alerts the user of the electronic device 20 that the batteries are low, that the batteries must be replaced, or any other suitable response. In one embodiment the display 28 is, for example, an LED designated specifically to indicate low batteries. In other embodiments the display 28 may be a screen which can display a low battery message, a replace batteries message, an audio alert, or other suitable message.

In one embodiment when the midpoint voltage meter 24 detects that a battery is draining too quickly, the transmitter 26 transmits a signal to the processing device 30. The receiver 32 receives the signal and sends it to the control circuit 34. The control circuit 34 then causes the output circuit 36 to indicate to the user that the batteries in the remote control need to be replaced. In one embodiment the control circuit 34 will not execute commands from the electronic device 20 until the batteries in the electronic device 20 have been replaced.

The output circuit 36 is, for example, a display screen of the processing circuit 30 configured to display visual and/or audio indicators to a user of the processing circuit 30. In one embodiment the output circuit 36 is a video signal processing circuit configured to output a video signal to a video display screen coupled to the processing circuit.

Figure 3:
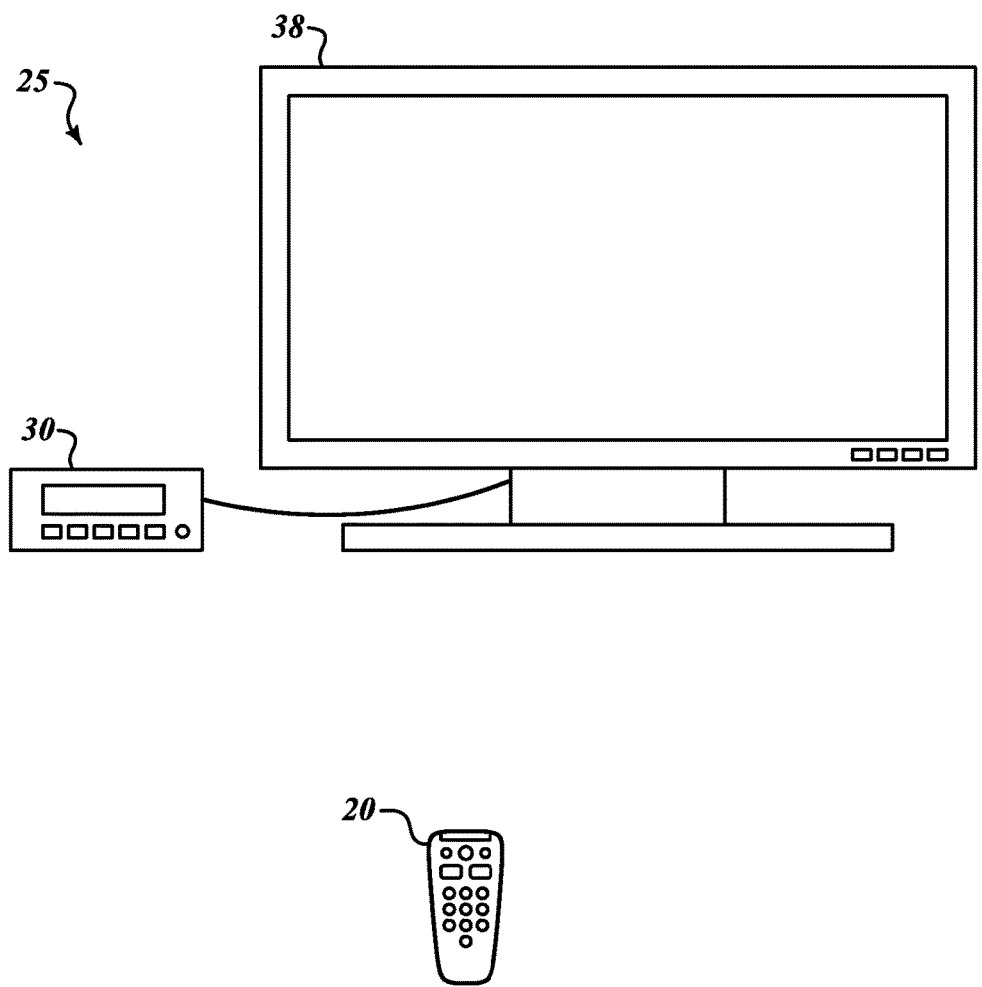
FIG. 3 illustrates a television, set top box, and remote control according to one embodiment.

FIG. 3 illustrates a system 25 including a remote control 20, a set top box 30, and a television 38 coupled to the set top box 30. The remote control 20 is configured to control the set top box 30 via wireless signals. The set top box 30 is, for example, a set top box for a satellite or cable television provider. The set top box receives television programming signals from the satellite or cable television provider and displays them on the television 38. A user of the system 25 may use the remote control 20 to control the set top box 30 in order to display content from a desired television channel, to operate a DVR associated with the set top box 30, or perform other functions common to set top boxes 30. The remote control 20 may also be configured to directly control the television 38.

The remote control 20 includes at least a battery stack 22 and a midpoint voltage meter 24 as described in relation to FIGS. 1 and 2, but not illustrated here. If the midpoint voltage meter 24 detects a non-uniform drain rate in the battery stack 22 then the remote control 20 transmits a signal to the set top box 30 indicating a non-uniform drain rate. The set top box 30 may then display on the television 38 a message indicating to the user that the batteries are low or must be changed. In one embodiment the set top box 30 will not execute commands from the remote control 20 until the user has replaced the batteries in the battery stack 22. In this way system 25 helps to encourage the user to quickly change the batteries to avoid a dangerous situation in which one or more batteries leaks dangerous chemicals or even explodes.

In other embodiments the remote control 20 will not transmit control signals to the set top box 30 until the user has changed the batteries. In this case the remote control 20 behaves as though the batteries are dead, even though the series voltage of the batteries may still be sufficient to power the remote control 20.

The system 25 according to one embodiment helps to promote the safety of its users. In many conventional set top box/remote control systems, a set top box may issue a low battery signal only when the series voltage of the batteries decreases to the point that soon the batteries will no longer power the remote control. Such a conventional system does not take into account the risk posed by a single defective battery whose voltage is decreasing at an accelerated rate. As described above, such a condition is often an indicator that the battery is likely to leak or may explode and potentially damage the system or endanger the user. In a system 25, according to one embodiment, the user is afforded extra protection against such a condition. In some embodiments the remote control 20 may specify which battery is draining too quickly and indicate to the user exactly which battery should be replaced. However, it is preferred to request that all batteries be replaced to avoid any further risk to the user.

Figure 4:
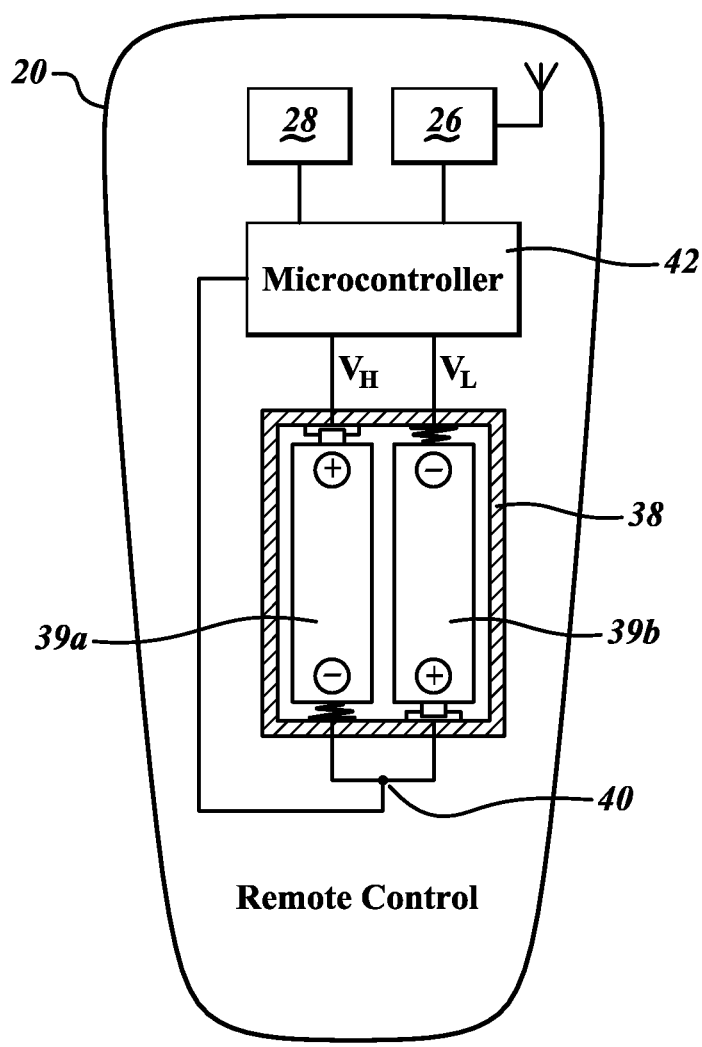
FIG. 4 illustrates a remote control according to one embodiment.

FIG. 4 illustrates a simplified block diagram of a remote control 20 according to one embodiment. The remote control 20 may be a remote control configured to control a set top box, a television, or any other equipment that may be operated with a remote control 20.

The remote control 20 includes a battery port 38 configured to house two batteries 39a, 39b connected in series. The total series voltage of the batteries 39a, 39b powers a microcontroller 42. In particular, the positive terminal of battery 39a provides high voltage $V_H$ to microcontroller 42 and the negative terminal of battery 39b provides low voltage $V_L$ to the microcontroller 42. The microcontroller 42 controls an infrared or a wireless transmitter 26 and a display 28. An intermediate node 40 connects the battery 39a to the battery 39b in series. The intermediate node 40 is also connected to the microcontroller 42. In this way the microcontroller 42 receives the intermediate voltage appearing on the intermediate node 40.

The microcontroller 42 processes input commands from the user, executes programs stored in memory, controls the transmitter 26, and controls the display 28. The microcontroller 42 also compares the intermediate voltage to a reference voltage to check for non-uniform drain rates in the batteries 39a, 39b as described in relation to FIGS. 1-3. If the microcontroller 42 detects a non-uniform drain rate, the microcontroller 42 can cause the display 28 to indicate to a user that the batteries 39a, 39b need to be replaced. In one embodiment, the microcontroller 42 causes the remote control to cease functioning until the batteries 39a, 39b have been replaced. In one embodiment, the microcontroller 42 causes the transmitter 26 to issue a wireless signal to an accompanying device, for example a set top box 30, indicating that the batteries need to be changed.

FIG. 4 illustrates only a few basic components of a remote control 20 according to one embodiment. In practice the remote control 20 may contain many more components, including many other circuit components and user input buttons to enable operation by a user.

Figure 5:
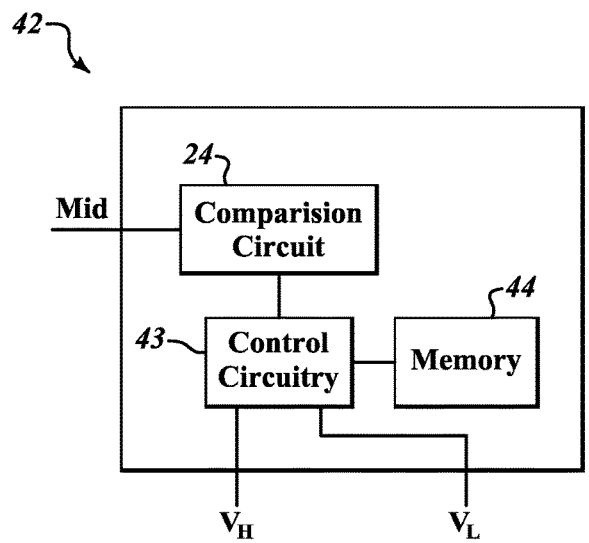
FIG. 5 illustrates a microcontroller according to one embodiment.

FIG. 5 is a block diagram of the microcontroller 42 of FIG. 4 according to one embodiment. The microcontroller 42 includes a comparison circuit 24, control circuitry 43, and memory 44. The control circuitry 43 is coupled to the comparison circuit 24 and memory 44.

The control circuitry 43 controls the function of the remote control 20. The control circuitry 43 reads and executes instructions stored in the memory 44. The control circuitry 43 also writes data to the memory 43. The control circuitry 43 controls the function of the comparison circuit 24.

When the comparison circuit 24 makes a comparison of the midpoint voltage 24, the control circuitry 43 receives the results of the comparison and takes action accordingly. If the comparison circuit 24 indicates that the batteries 39a, 39b are draining at a non-uniform rate, then the control circuit can cause the display 28 to emit a low-battery notification, the transmitter 26 to transmit a low battery signal to the set top box 30, or the remote control to cease functioning until the batteries 39a, 39b have been replaced.

The microcontroller 42 of FIG. 5 is a simplified block diagram of one embodiment given by way of example only. Those of skill in the art will understand that a microcontroller may contain many more or different function parts not illustrated here for simplicity.

Figure 6:
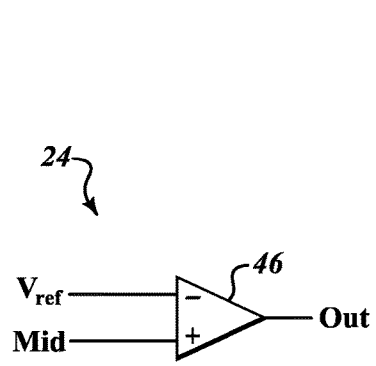
FIG. 6 illustrates a comparison circuit according to one embodiment.

FIG. 6 illustrates the comparison circuit 24 of FIG. 5 according to one embodiment. The comparison circuit has an inverting input and a non inverting input. The midpoint voltage is received at the non-inverting input. A selected reference voltage source provides a selected reference voltage of a set value to the inverting input.

In FIG. 6, the output of the comparator 46 is high as long as the midpoint voltage is higher than the set reference voltage. The output of the comparator 46 is low when the midpoint voltage is lower than the reference voltage. In this simple way it can be determined if the midpoint voltage is higher or lower than a reference voltage. However more sophisticated embodiments can be used. For example, in one embodiment, the reference voltage 48 is variable a voltage that is determined from the series voltage and varies exactly with the series voltage. In this embodiment the value of reference 48 is made to be exactly one half of the series voltage. A simple resistor divider circuit having equal value resistors coupled between $V_H$ and $V_L$ nodes on the battery can therefore provide the reference voltage Vref. If the series voltage drops slightly the reference voltage will decrease as well so that the comparison performed is a true midpoint for the state of that particular set of batteries.

In some circumstances, having Vref be a set, unchangeable amount is preferred, while in others, having it be variable is preferred.

While some particular embodiments have been described, many different embodiments are possible, as will be apparent to those of skill in the art in light of the present disclosure. All such embodiments fall within the scope of this disclosure. For example, in one embodiment, the reference voltage Vref is a variable voltage that is determined from the series voltage and varies exactly with the series voltage. In this embodiment, the value of reference Vref is made to be exactly one half of the series voltage. A simple resistor divider circuit having equal value resistors coupled between the $V_H$ and $V_L$ nodes on the battery can therefore provide the reference voltage Vref. If the series voltage drops slightly the reference voltage will decrease as well so that the comparison performed is a true midpoint for the state of that particular set of batteries.

In some circumstances, having Vref be a set, unchangeable amount is preferred, while in others, having Vref variable is preferred.

Figure 7:
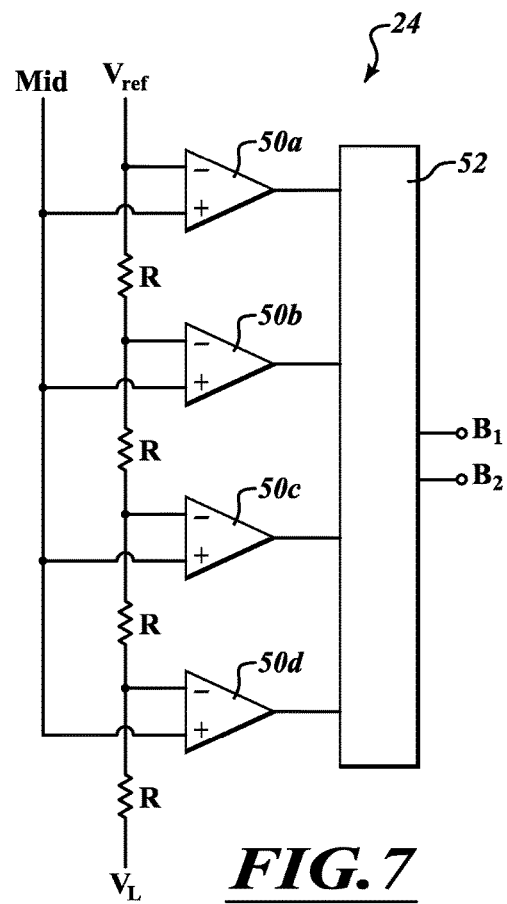
FIG. 7 illustrates an analog-to-digital converter according to one embodiment.

FIG. 7 illustrates a comparison circuit 24, according to a preferred embodiment. The comparison circuit 24 of FIG. 7 is a two-bit analog-to-digital converter according to one embodiment. The analog-to-digital converter 24 includes four comparators 50a, 50b, 50c, 50d each receiving the midpoint voltage on a respective non-inverting node. A plurality of resistors R of equal value are connected in series between a reference voltage Vref and $V_L$. The inverting inputs of the comparators 50a, 50b, 50c, 50d are each connected to a respective node on the series chain of resistors R. The outputs of the comparators are each connected to a digital output encoder 52. The digital output encoder has two outputs B1, B2 each representing a respective bit of the digital output.

Each comparator 50a, 50b, 50c, 50d of the analog-to-digital converter 24 compares the midpoint voltage to a respective reference voltage. The respective reference voltages are divisions of the primary reference voltage Vref. The chain of resistors R thus acts as a voltage divider to provide a plurality of reference voltages. Each comparator 50a, 50b, 50c, 50d will output a high or low value according to the individual comparisons. The digital outputs B1 and B2 are determined by the comparisons. In particular the digital output encoder includes a plurality of logic gates configured to receive as four inputs the outputs of the comparators 50a, 50b, 50c, 50d and to output two binary outputs B1 and B2 accordingly. The outputs B1, B2 can combine to make binary values 00, 01, 10, or 11.

The outputs B1 and B2 are read by the control circuitry 43 of the microcontroller 42 and compared to values in memory. In one example, digital value 11 represents a state in which the midpoint voltage is higher than half of the series voltage by more than a threshold amount and the control circuitry determines that there is a non-uniform drain rate among the batteries 39a, 39b. In one embodiment the value 00 represents a state in which the midpoint voltage is lower than half of the series voltage by more than a threshold amount and the control circuitry 43 determines that there is non-uniform drain rate among the batteries 39a, 39b. In one embodiment, values 01, 10 each represent a state in which the batteries 39a, 39b are determined to be draining at a sufficiently uniform rate.

The analog-to-digital converter 24 of FIG. 7 illustrates only a two-bit analog-to-digital converter. In practice the analog-to-digital converter 24 may more than two bits, for example an 8-bit analog-to-digital converter. The threshold differences can be selected by selecting appropriate values of the resistors R connected in series. Many variations are possible as will be apparent to those of skill in the art in light of the present disclosure. All such embodiments fall within the scope of this disclosure.

Figure 8:
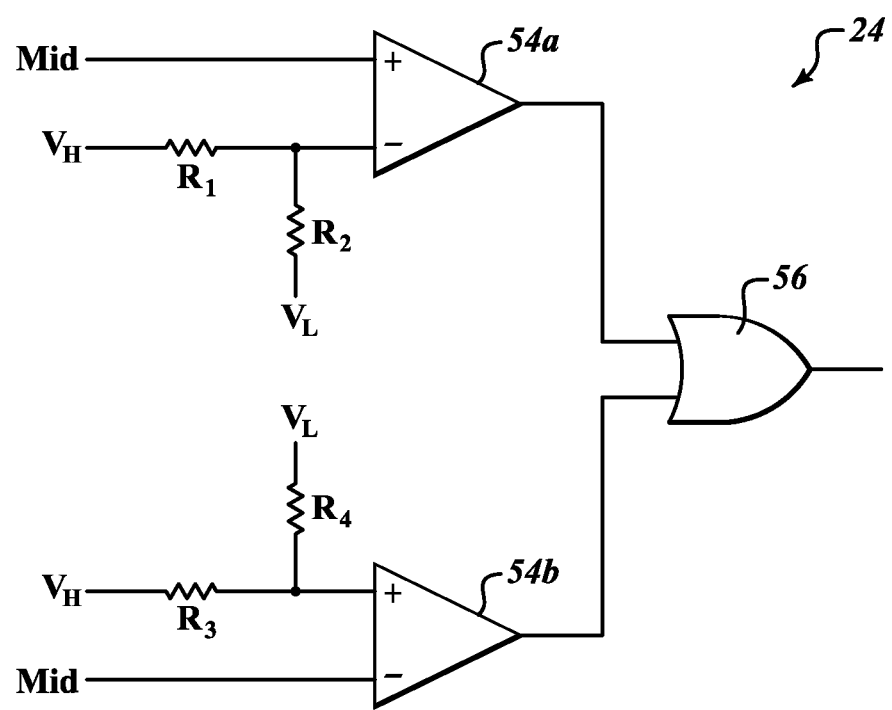
FIG. 8 illustrates a comparison circuit according to one embodiment.

FIG. 8 illustrates the comparison circuit 24 of FIG. 5 according to one embodiment. Comparators 54a, 54b each receive the midpoint voltage on one input and a reference voltage on another input. The outputs of comparators 54a, 54b are connected to an OR gate 56. Resistors R1, R2 act as a voltage divider to provide a first reference voltage to the inverting input of comparator 54a. Resistors R3, R4 act as a voltage divider to provide a second reference voltage to the non-inverting input of comparator 54b.

In this embodiment OR gate 56 provides a high output if either or both of the comparators 54a, 54b provide a high output. A high output by the OR gate 56 indicates that there is a non uniform drain rate among the batteries 39a, 39b. The values of the resistors R1, R2 are selected to provide a high threshold voltage reference. If the midpoint voltage exceeds this high voltage reference, then comparator 54a outputs a high voltage and the OR gate also outputs a high voltage. If the value of the midpoint voltage is less than the high voltage reference, then midpoint voltage has not exceeded the high voltage reference and the output of the comparator 54a is low. The high voltage reference thus acts as a high threshold value which should always be higher than the midpoint voltage.

The values of resistors R3, R4 are selected to provide a low voltage reference to the comparator 54b. The low voltage reference acts as a low voltage threshold below which the midpoint voltage should never cross. If the midpoint voltage is less than the low voltage reference then comparator 54b outputs a high output and the OR gate switches high indicating a non uniform drain rate among the batteries 39a, 39b. If the midpoint voltage is higher than the low voltage reference, then the output of the comparator 54b is low. If the outputs of both of the comparators 54a, 54b are low, then midpoint voltage falls within an acceptable range and the output of the OR gate is also low. The output of the OR gate 56 is provided to the control circuitry 43 of FIG. 5. The control circuitry 43 can, therefore, respond to the state of the midpoint voltage according to the output of the OR gate. The values of the resistors R1-R4 can be selected to provide any desired threshold values. For example the values of the resistors R1-R4 can be selected to provide that a midpoint voltage that differs by more than 10% (higher or lower) of half of the series voltage will indicate a non-uniform drain rate. In other embodiments the threshold difference can be more or less than 10%. In one embodiment the threshold difference is the value of 1/e, where e is Euler's number (e ~2.7818).

Figure 9:
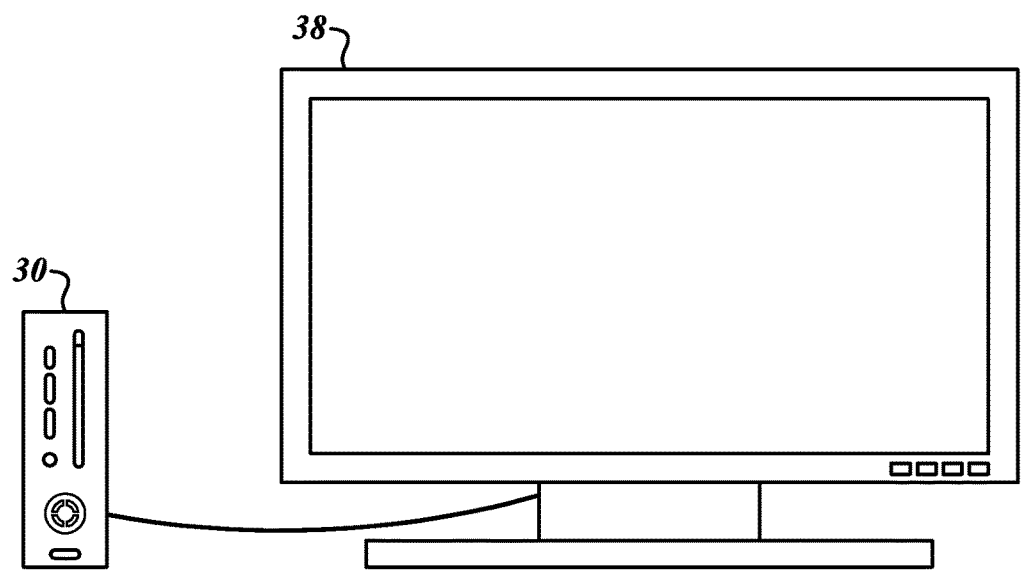
FIG. 9 illustrates a home gaming system according to one embodiment.
Figure 9:

FIG. 9 illustrates an embodiment in which the electronic device 20 is a gaming controller for a home gaming console 30. In such an embodiment, the gaming controller 20 has a battery stack 22 and a midpoint voltage comparison circuit 24 according to FIGS. 1-8. The gaming console 30 is connected to a television 38 and displays game images on the television 38. When the midpoint voltage comparison circuit 24 finds a non-uniform drain rate among the battery stack 22, the game controller 20 can output a signal to the gaming console 30. The game console 30 can then cause the television 38 to display a low battery signal to the user. Also, the gaming console 30 can ignore further commands from the gaming controller 20 until the batteries have been changed. In other embodiments, the gaming controller 20 will not function until the batteries have been replaced.

Figure 10:
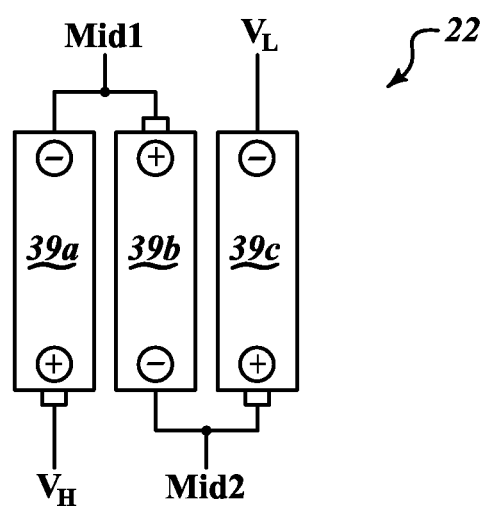
FIG. 10 illustrates a battery stack according to one embodiment.

FIG. 10 illustrates an embodiment in which the battery stack 22 contains three batteries 39a, 39b, 39c connected in series to power an electronic device 20 (not shown). In this case there are two intermediate nodes at which batteries are connected in series, Mid1 and Mid2. Intermediate node Mid1 is the node that connects batteries 39a, 39b. Intermediate node Mid2 is the intermediate node that connects batteries 39b, 39c. Either or both Mid1 and Mid2 can be connected to a midpoint voltage comparison circuit 24 (not shown). If Mid1 is connected to a midpoint voltage comparison circuit 24, then the midpoint voltage comparison circuit can check to see if the voltage at Mid1 is within a threshold difference of ⅔ of the total series voltage. If Mid1 is greater or less than ⅔ the total series voltage by more than a threshold difference then the midpoint voltage comparison circuit 24 determines that there is a non-uniform drain rate among the batteries 39a, 39b, 39c.

Likewise if Mid2 is connected to a midpoint voltage comparison circuit 24, then the midpoint voltage comparison circuit can check to see if the voltage at Mid2 is within a threshold difference of ⅓ of the total series voltage. If Mid2 is greater or less than ⅓ the total series voltage by more than a threshold difference, then the midpoint voltage comparison circuit 24 determines that there is a non-uniform drain rate among the batteries 39a, 39b, 39c.

Thus, the term, midpoint voltage is sufficiently broad to include voltages sensed at various locations in a three, four, five or more battery system and not just the middle voltage value of a series battery connection. In one embodiment, it is not desired to determine which particular battery 39a, 39b, 39c is aberrantly draining. It is only desired to determine that there is a non uniform drain rate. In other embodiments, it may be desired to determine which battery 39a, 39b, 39c is aberrantly draining. It is possible to do either in view of the present disclosure.

In other embodiments, the number of batteries may be greater than two or three. In fact a non-uniform drain rate can be detected in any number of batteries connected in series. Such other embodiments also fall within the scope of the present disclosure.

While some embodiments include comparing a midpoint voltage of series connected batteries, other embodiments include comparing voltages of parallel connected batteries. For example voltage levels of parallel connected batteries may be compared to each other to detect an uneven discharge rate among the batteries.

While some embodiments include an electronic device 20 with a wireless transmitter 26 or receiver 32, other embodiments include no wireless transmitter 26 or receiver 32. One embodiment can include any electronic device 20 that may receive battery power. The electronic device 20 can be connected to an AC power source and use battery power as backup power.

Figure 11:
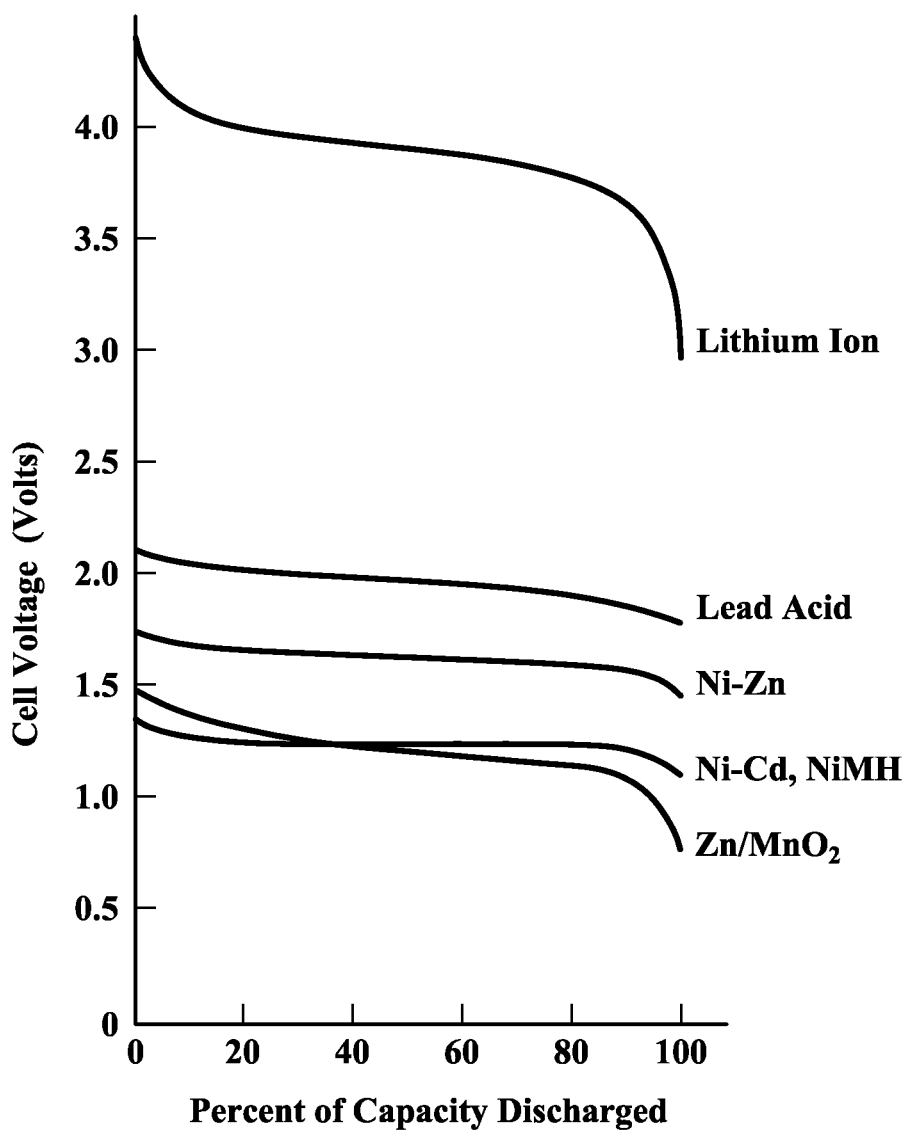
FIG. 11 is graph illustrating discharge curves for various battery types.

FIG. 11 is graph illustrating the voltage across different types of batteries against percentage of capacity discharged. It is known that the voltage of a battery cell is determined by the specific chemistry of the battery. Furthermore, the rate of change in the voltage as a battery discharges is different for each type of battery. For example, a lithium ion battery cell has a higher voltage than most other cells and also experiences a sharper change in the voltage at the beginning and end of its life cycle than many other kinds of batteries. Lead-acid, Nickel-Zinc, Nickel-Cadmium, Nickel-metal-hydride, and Zinc-Magnesium oxide batteries all have different voltages and decay curves. Thus, in one embodiment, the specific threshold voltages for determining non-uniform drain rates can be adjusted based on the type of battery known, or likely to be used in a particular device. For instance a lead acid battery may have lower threshold differences than a lithium ion battery which experiences greater changes in voltages across its lifetime. Such design factors can be taken into account when designing a particular electronic device 20 according to one embodiment.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device comprising:
a battery indicator;
a wireless transmitter configured to transmit control signals;
a control circuit configured to control the battery indicator and the transmitter; and
a battery port configured to receive a first battery and a second battery in series to power the control circuit and the battery indicator, the battery port including:
a first power supply terminal configured to supply a high supply voltage to the control circuit;
a second power supply terminal configured to supply a low supply voltage to the control circuit; and
an intermediate node configured to electrically connect the first and second batteries in series and to supply to the control circuit an intermediate voltage at the intermediate node, the control circuit configured to measure the intermediate voltage, to determine if the first and second batteries have different voltages, and to cause the battery indicator to issue a low battery signal and cause the transmitter to inhibit transmission of the control signals in response to determining that a difference between the first and second battery voltages is greater than a threshold difference.

2. The device of claim 1 wherein the control circuit compares a total series voltage of the first and second batteries to the intermediate voltage.

3. The device of claim 1, further comprising a memory circuit coupled to the control circuit, the control circuit configured to compare the intermediate voltage to a value stored in memory.

4. The device of claim 1 wherein the wireless transmitter is configured to transmit the control signals to control a remote processing unit.

5. The device of claim 4 wherein the wireless transmitter is configured to transmit the low battery signal to the remote processing unit.

6. The device of claim 1 wherein the low battery signal is an audio or video signal.

7. A system comprising:
a processing unit;
a remote control comprising:
a transmitter configured to transmit control signals to control the processing unit;
a control circuit coupled to the transmitter;
a battery port configured to receive a first and a second battery;
an intermediate node coupled to the battery port and configured to electrically connect the first and the second batteries in series when the first and second batteries are placed in the battery port; and
an intermediate voltage comparison circuit configured to detect an intermediate voltage at the intermediate node and to detect a non-uniform drain rate in the first and the second battery, and to cause the battery indicator to issue a low battery signal and cause the transmitter to inhibit transmission of the control signals in response to determining that a difference between the first and second battery voltages is greater than a threshold difference.

8. The system of claim 7 wherein the processing unit is a set top box configured to provide video signals to a television.

9. The system of claim 7 wherein the intermediate voltage comparison circuit is configured to compare the intermediate voltage to a series voltage of the first and second batteries.

10. The system of claim 7 wherein the intermediate voltage comparison circuit is an analog-to-digital converter.

11. The system of claim 7 wherein the transmitter transmits the battery fault signal to the processing unit.

12. A method comprising:
connecting a first and second battery in series at an intermediate node;
providing a total series voltage from the first and second batteries to power an electronic device;
measuring an intermediate voltage at the intermediate node;
calculating a voltage difference between the first and second batteries;
determining that the voltage difference between the first and second batteries is greater than a threshold difference;
issuing a battery fault signal in response to determining that the voltage difference is greater than the threshold difference; and
inhibiting transmission of control signals from a transmitter in response to determining that the voltage difference is greater than the threshold difference.

13. The method of claim 12, further comprising:
issuing control signals from the electronic device to control a processing unit;
transmitting the battery fault signal to the processing unit; and issuing a low battery or faulty battery warning from the processing unit upon receiving the battery fault signal from the electronic device.

14. The method of claim 13 further comprising:
inhibiting function of the processing device upon reception of the battery fault signal by the processing device; and restoring function of the processing device upon replacement of the first and second batteries.

15. The method of claim 12 wherein the electronic device is a remote control.

16. The method of claim 15 wherein the processing device is a set top box.

* * * * *